Patented Dec. 15, 1931                                    1,836,303

UNITED STATES PATENT OFFICE

PHILIPP BORN, OF BAD HOMBURG, GERMANY, ASSIGNOR, BY MESNE ASSIGNMENTS, TO NAAMLOOZE VENNOOTSCHAP NEDERLANDSCHE GRUYÈRE-BLOKMELK FABRIEK, OF ZWOLLE, HOLLAND

PROCESS FOR THE PRODUCTION OF MILK AND CREAM CHOCOLATE

No Drawing. Application filed February 26, 1926, Serial No. 90,972, and in Germany February 27, 1925.

For the production of milk-chocolate either liquid condensed milk or compact milk-powder has been employed till now. In the former case condensed milk had to be subjected to further concentration in the chocolate-mills, e. g. until a cream-like mass was obtained, which was subsequently worked up with cocoa and sugar. For the purpose of extracting the water still present in the mixed material, flat layers of the latter were then treated in heat-chambers and after that worked up in the usual manner.

When using milk-powder, this was blended with cocoa and sugar in the mixing-machine, whereupon the mixed stuff had to undergo a manifold treatment in the rolling-mill and was then worked up in grinding machines. In a similar way the production of cream-chocolate has been effected till now.

It has been found out that the production of milk- and cream-chocolate is considerably simplified and improved by the conversion of the milk into the shape of blocks, preferably with the addition of sugar, the milk-preparations thus obtained then being introduced into the process of chocolate production.

For producing milk- and cream-bars especially suited to the preparation of chocolate, one may e. g. proceed as follows:

Milk or milk enriched in its fat content (cream) is subjected to a treatment in vacuum apparatuses with stirrers for extracting the water, until a milky mass is formed which is practically freed from water. In this operation the starting material has preferably to undergo a process of sterilization previous to or during the dehydrating process, e. g. by the pasteurizing method, and has to be mixed with an appropriate amount of sugar. The dehydrated material, which should generally not contain more than 10% of water, but rather a smaller quantity, is subsequently converted into blocks or bars.

Example 1

Fresh whole-milk is pasteurized e. g. by heating to 70° and evaporated to a water content of e. g. 6–8% in vacuum apparatuses with stirrers at temperatures preferably kept below 50° C. and lying e. g. between 36–42° C., after a suitable quantity of a syrup-like sugar solution has been admixed, which is produced by boiling down sugar with little water. The mass thus obtained is put in moulds while still in a warm condition and subjected to pressure.

Example 2

Fresh whole-milk is pasteurized, whereupon its fat content is enriched by adding a suitable amount of milk-fat, e. g. in the form of cream, preferably pasteurized or sterilized and appropriately homogenized thereafter. Furthermore the requisite quantity of sugar is added. Instead of admixing cream to the whole-milk, one may as well proceed e. g. in such a manner that pasteurized fresh milk, with or without the admixture of sugar, is first evaporated alone, e. g. to a fat content of 8–16%, whereupon cream is added to this product. In both cases the further treatment is effected in conformity with Example 1.

It has been found out that the product may be given a very fine aroma by admixing certain quantities of butterfat. In some cases, it is therefore advisable to add melted or emulsified butter to the milk, or to the milk having an increased fat content, before or during the process of evaporation.

It is not necessary to undertake the reduction of milk or cream to the shape of bars or blocks in the chocolate-mill itself; it is rather expedient to produce the milk- or cream-bars in such districts as are distinguished by an abundance of milk of first rate quality, and to send them thence to the chocolate-mills. It has been shown that the blocks described above will have an excellent durability when coated with protective layers, e. g. of cocoa-butter. It has proved important, in this case, to let those bars cool down as far as possible, i. e. through the whole of the mass, before the protective layers are applied. Their application may e. g. be effected by dipping the cooled bars into melted cocoa-butter or by coating the surface of the blocks with melted cocoa-butter or with a suitable solution of cocoa-butter, one or several times.

The cocoa-butter may also be substituted, partially or completely, by other fats easily meltable and congealing when cooled down, such as cocoanut-oil and similar hard fats. Additional substances may also be added to the fats or the fat-mixtures, e. g. such as have a preservative action, or as will improve their smell or their taste, e. g. vanillin.

As further preservatives we may take into consideration e. g. cocoa-mass, which is produced in a liquid form from torrefied peeled cocoa-beans by a treatment with heated rollers, and which may eventually be mixed with cocoa-butter or sugar, or both; also suitable mixtures of sugar and starch-syrup, which should previously have been subjected to a centrifugal process, if possible. Finally, it has likewise proved possible to preserve the milk-block by treating its surfaces with conserving substances, e. g. alcohol, in which also small amounts of preserving or disinfecting matters, such as vanillin, may be dissolved. By this treatment, especially in the case of a repeated treatment, the upper-most layer of the block or bar itself is, as it were, converted into a protective layer.

According to one form of carrying the invention into effect, the milk or the cream is combined with a certain percentage of cocoa-butter, previous to or in the course of the extraction of water, substances such as vanillin being admixed if desired, preferably in such a way that melted cocoa-butter is homogenized alone or in combination with milk or cream. Through this admixture, too, the durability of the milk-block can be increased.

The following example will explain how milk- or cream-blocks of the above-mentioned kind may be worked up into milk- or cream-chocolate.

*Example 3*

19 kg. of cocoa-mass (containing 52% of cocoa-butter), 27 kg. of powder-sugar, and 2 kg. of cocoa-butter are thoroughly worked in the mixing-machine at 35–40° C., while 40 kg. of block-milk (containing 60% of milky substance and 40% of sugar) are added in shape of lumps. After 40–50 minutes the mixed material has assumed the form of a doughy, uniform mass. The latter is then passed through a steel-roller mill, the rollers of which are so loosely spanned that the mass will come off in a soft state, whereupon this mass is immediately passed through a second roller-mill with tightly spanned rollers. By this double rolling a powder-like material of a remarkable degree of fineness will be obtained. This is subsequently worked through in a grinding-mill (round conche) for about 3 hours at 35–40° C., while admixing 12 kg. more of cocoa-butter, whereupon the temperature is gradually raised to 85° C. Under these conditions the grinding-machines are kept running for four more hours, whereupon water is passed into the double bottom for cooling the material and the working of the grinding-mill is maintained for another hour. Then the mass is worked up in the usual manner, e. g. as tablets.

If compared with the working of milk-powder, the following advantages will be realized: The working through in the mixing-machine is done in the shortest time possible, although only 2 kg. of cocoa-butter are admixed, in contradistinction to about 10–12 kg. as used in the working of milk-powder. In the present process the total supply of cocoa-butter amounts to 2 plus 12, i. e. 14 kg., whereas with the application of milk-powder 16 kg. are required, i. e. a surplus of 2 kg. Although the material is rolled but twice in the present proceeding, it yields a powder-like product of a remarkable degree of fineness, while with the application of milk-powder a prolonged rolling and usually, in the course of the rolling, a reiterated working through in the mixing-machine is indispensable. But the principal advantage of the present invention consists in the extraordinary economy of time and work attained in the process of grinding. The whole grinding process requires only about 8 hours, as shown by the example, whereas the same process generally takes at least 30 hours when milk-powder is used. The restriction of the grinding process is partly due to the fact that the present invention permits of working at increased temperatures, e. g. at 85°, while the temperatures must be kept lower with the application of milk-powder, since the latter loses its aroma at higher temperatures and sometimes gets a cheesy taste.

As the production of milk-chocolate from condensed milk involves an extraordinary expenditure of time (e. g. according to approved Swiss prescriptions 72 hours) and presuppposes the existence of large heat-chambers with exhausters, remarkable advantages are likewise achieved in contradistinction to that process.

The milk- or cream-chocolate made in accordance with the invention represents a product of incontestably superior quality being chiefly distinguished by its fine aroma and having the advantage that its excellent taste and smell remain unchanged even after storage for a long time. It is known that milk-powder chocolate and like preparations do not have this property.

In the same or a similar way the milk- and cream-blocks can also be applied to other products, e. g. to milk- and cream-pralines.

Claims:

1. A process for the manufacture of edible milk chocolate which comprises adding a milk preparation, consisting of blocks obtained by the evaporation of milk or cream with the addition of sugar to give a solid substantially free from water, to the chocolate forming constituents such as cocoa, sugar and cocoa-butter, mixing the same in a mixing machine to form a doughy mass, rolling the mass and grinding it at a temperature above 70° C. with the addition of cocoa-butter.

2. A process for the manufacture of edible milk chocolate which comprises adding a milk preparation, consisting of blocks obtained by the evaporation of milk or cream with the addition of sugar to give a solid substantially free from water, to the chocolate forming constituents such as cocoa, sugar and cocoa-butter, mixing the same in a mixing machine to form a doughy mass, rolling the mass and grinding it at a temperature of about 85° C. with the addition of cocoa-butter.

3. A process for the manufacture of edible milk chocolate which comprises adding a milk preparation, consisting of blocks obtained by the evaporation of milk or cream with the addition of sugar to give a solid substantially free from water, to the chocolate forming constituents such as cocoa, sugar and cocoa-butter, mixing the same in a mixing machine to form a doughy mass, rolling the mass and grinding it at a temperature above 70° C. with the addition of cocoa-butter, the time of grinding occupying not more than about 10 hours.

4. A process for the manufacture of edible milk chocolate which comprises adding a milk preparation, consisting of blocks obtained by the evaporation of milk or cream with the addition of sugar to give a solid substantially free from water, to the chocolate forming constituents such as cocoa, sugar and cocoa-butter, mixing the same in a mixing machine to form a doughy mass, rolling the mass and grinding it with the addition of cocoa-butter, whereby the grinding is started at 35–40° C. and the temperature then gradually raised above 70°.

5. A process for the manufacture of edible milk chocolate which comprises adding a milk preparation, consisting of blocks obtained by the evaporation of milk or cream with the addition of sugar to give a solid substantially free from water, to the chocolate forming constituents such as cocoa, sugar and cocoa-butter mixing the same in a mixing machine to form a doughy mass, rolling the mass and grinding it with the addition of cocoa-butter, whereby the grinding is started at 35–40° C. and the temperature then gradually raised to about 85° C., which temperature is maintained until the grinding is completed.

In testimony whereof I affix my signature.

PHILIPP BORN.